United States Patent [19]

Marshall

[11] Patent Number: 4,708,487
[45] Date of Patent: Nov. 24, 1987

[54] SPACE SAVER BLENDER

[76] Inventor: Robert Marshall, 262A Haddon Hills, Haddonfield, N.J. 08033

[21] Appl. No.: 919,978

[22] Filed: Oct. 17, 1987

[51] Int. Cl.⁴ .......................... B01F 7/00; B01F 15/00
[52] U.S. Cl. ..................................... 366/206; 312/245; 366/197; 366/251; 366/279; 366/601
[58] Field of Search ................................. 366/247-251, 366/142, 197, 199, 205, 206, 314, 330, 605; 312/245-248; 248/201, 317, 318; 99/484, 485, 468, 486

[56] References Cited

U.S. PATENT DOCUMENTS

| | | |
|---|---|---|
| 1,606,992 | 11/1926 | Gilchrist . |
| 2,055,735 | 9/1936 | Stull et al. . |
| 2,462,089 | 2/1949 | Frisbie . |
| 2,515,755 | 8/1950 | Krause . |
| 2,662,754 | 12/1953 | Sharp . |
| 2,797,901 | 8/1957 | Seyfried . |
| 3,064,951 | 11/1962 | Fillweber . |
| 3,299,226 | 1/1967 | Edwards . |
| 3,311,353 | 3/1967 | Rogenski . |
| 3,356,344 | 12/1967 | Price . |
| 3,443,795 | 5/1969 | Gresens et al. . |
| 3,854,705 | 12/1974 | Shaff . |
| 4,233,891 | 11/1980 | Schindler ........................... 99/348 |
| 4,480,926 | 11/1984 | Lattery, Jr. et al. ............... 366/251 |
| 4,487,509 | 12/1984 | Boyce . |
| 4,620,476 | 11/1986 | Brym ............................ 366/205 X |

Primary Examiner—Timothy F. Simone
Attorney, Agent, or Firm—Thomas A. Lennox

[57] ABSTRACT

A blender for installation under kitchen cabinets includes a housing mounted underneath the cabinet with a shaft detent connection bushing extending downwardly from the housing connected to a motor which is electrically controlled to provide various speeds to the bushing into which a shaft disengagingly connects having blending blades at the lower end with a cup shaped container with annular threads at the top edge which engage annular threads on the bottom wall of the housing to seal the container around the blender shaft with a switch to shut off the power with the cup container is not in position.

13 Claims, 6 Drawing Figures

SPACE SAVER BLENDER

BACKGROUND OF THE INVENTION

This invention involves a blending device attachable on the underside of kitchen wall cabinets. This invention also involves a blender and drink mixer device suitable for hanging on the wall and particularly on the underside of kitchen cabinets.

Typical kitchen blenders have taken the general shape of the well known WARING blender which has a motor in the base with a shaft extending upwardly through a housing to engage the blender blades. Although the shape of the shaft end has varied, a multi-part container interfits onto the shaft and rests on the top of the housing. In the bottom of the container, a bushing device allows free spinning mixer blades to be spun by the shaft engaged into the bushing. This device effectively mixes all types of liquids, solids and semi-solids to adjustable degrees. A disadvantage of this device is that upon use, it must be taken apart and each individual part of the container cleaned. Further, the motorized housing must be removed from a cabinet, placed on the counter and replaced after each use. Installing the motor into the kitchen counter top wastes counter space and eventually prevents replacement of the blender with another model.

Milk shake mixers have generally taken a different shape wherein the motor is supported by a frame into which a container is placed under the motor. A shaft is directly connected to the motor with a mixing device extending outwardly from the lower end of the shaft. This mixer is effective for making milk shakes or freezes which entails melting and mixing ice cream into liquids, but has little further use. The drink mixer device is difficult to clean and must also be stored away after use making it inconvenient for regular daily use.

A number of mixers and devices have been provided, but none satisfy the above needs nor attain the objects listed hereinbelow.

SUMMARY OF THE INVENTION

It is an object of the present invention to provide a blender device which may be fixed under a kitchen cabinet on a permanent basis.

It is a further object of the present invention to provide a blender that is attached under a cabinet in the kitchen with the container attached to the blender and extending downwardly to be easily removed for emptying and cleaning.

It is a further object of the present invention to provide a blender which may be mounted on the wall of the kitchen or under the cabinet thereby saving space and providing convenience for continued use of the blender.

It is an additional object of the present invention to provide a blending device which utilizes only three parts that come into contact with the food and require cleaning, these parts being easily cleaned and requiring essentially no dismantling during the cleaning process.

It is a further object of the present invention that the motor housing of a blender device attached to the bottom surface of kitchen cabinets provide an easily cleanable surface should any food be splattered on the surface.

It is an additional object of the present invention to provide a blending device which seals the food into the container holding the contents to be blended and preventing essentially no loss of the contents through splashing or leaks.

It is a further object of the present invention to provide a blending device with a switch mechanism essentially preventing inadvertent spinning of the blending mechanism unless the container protecting the spinning mixing blades is in position.

It is a further object of the present invention to provide a housing for the motor to drive a blender with sufficient ventilation, despite it being fixed to the underside of a kitchen cabinet.

It is an additional object of the present invention to provide a blender with a mixing blade shaft that is detachable from the motor connection allowing easy cleaning of the entire shaft and blades.

It is an additional object of the present invention to provide a support for the blade shaft in the blending container preventing inadvertent disengagement of the shaft.

The blending device of the present invention is mountable under a kitchen cabinet. While the device may also be mounted on a wall, the device is particularly suitable and allows mounting under the cabinet to utilize space which otherwise is wasted. The blending device includes a housing having a top wall, a bottom wall and a front side wall. A mounting device is provided to mount the top wall of the housing on the underside of wall cabinets. A shaft detent connection device extends through the bottom wall of the housing to disengageably connect to a shaft held vertically from the connection means. A motor drive device receives electrical current and rotatably spins the detent connection device. A control device is provided to vary the speed of the motor device and thus the shaft held vertically from the connection device. Wiring is provided to electrically connect the motor drive device and the control device to an electrical power source. Annular threads are molded as an integral part of the bottom wall of the housing and extend downwardly from the bottom wall positioned with the connection device in the center of the annular threads. It is preferred that the annular threads be on the outside of a cylindrical extension molded as part of and extending downwardly from the bottom wall of the housing. A cylindrical cup shaped container having annular threads proximate to the upper edge of the container, the threads being of a size and shape to engage the annular threads in the bottom wall to hold the container upright to the housing. The upper end of the shaft is disengageably connected to the connection device. At the lower end of the shaft a blender blade device is secured to the shaft. The blades extend outwardly from the shaft to vigorously blend liquids and solids when the shaft is rotated at a high rate of speed. The terms "blend" and "blending" are not intended to be limiting and include mixing, beating and whipping and stirring of liquids or solids or mixtures of liquids and solids.

DESCRIPTION OF PREFERRED EMBODIMENTS

It is preferred that ventilation be provided in the top wall of the motor housing and that spacers be provided to maintain a space between the top wall of the housing and the surface to which the housing is attached. It is preferred that a control device include a plurality of buttons connected to circuitry to provide an off button as well as buttons to vary the rotational speed of the blender shaft.

It is further preferred that a safety switch device extend through the bottom wall of the housing proximate to a position where the upper open edge of the cylindrical cup shaped container abuts the bottom surface of the bottom wall. The switch is positioned such that when the cylindrical cup shaped container is threadably engaged in position, the upper edge of the container depresses the switch and allows electrical power to reach the motor.

It is preferred that the inside of the bottom of the cup shaped container be convex upwardly toward the inside of the container. It is preferred that the inside bottom surface of the container be shaped like a truncated cone with a spherical depression in the center to receive a rounded lower end of the shaft. The support of the depression supports the shaft during spin and prevents the shaft from inadvertently dropping out of the motor connection, while avoiding hard contact with the shaft.

It is preferred that a cylindrical shape molded into the bottom wall depend downwardly from the bottom wall of the housing with male threads extending from the outside vertical surface of the cylindrical shape. The cylindrical shape is flat on the bottom surface to allow easy cleaning. It is further preferred that the container have female threads cut out of the interior wall proximate to the upper edge to engage the male threads on the cylindrical shape. An shoulder seal is preferred in the container just below the threads to seal the container engaged into the housing. The preferred seal includes an upraised annular shoulder to engage the bottom surface of the cylindrical shape on which the cup is threadably attached. A preferred annular trough is cut out of the cup surface below and outside the annular shoulder to catch any liquid escaping the seal between the shoulder and the bottom of the cylindrical shape. An elastic ring shaped seal is preferably adhesively attached to the sealing surface of the cylindrical shape as the mating surface to the annular shoulder on the cup.

It is preferred that the blades be shaped to create a vertical upward force on the mixing shaft as the shaft is rotated by the motor tending to maintain proper seating of the shaft in the detent connection bushing holding and spinning the shaft.

It is further preferred that the threads connecting the container to the housing be constructed to allow engagement and disengagement of the container from the housing with no more than a 180° degree turn.

Figure 1:
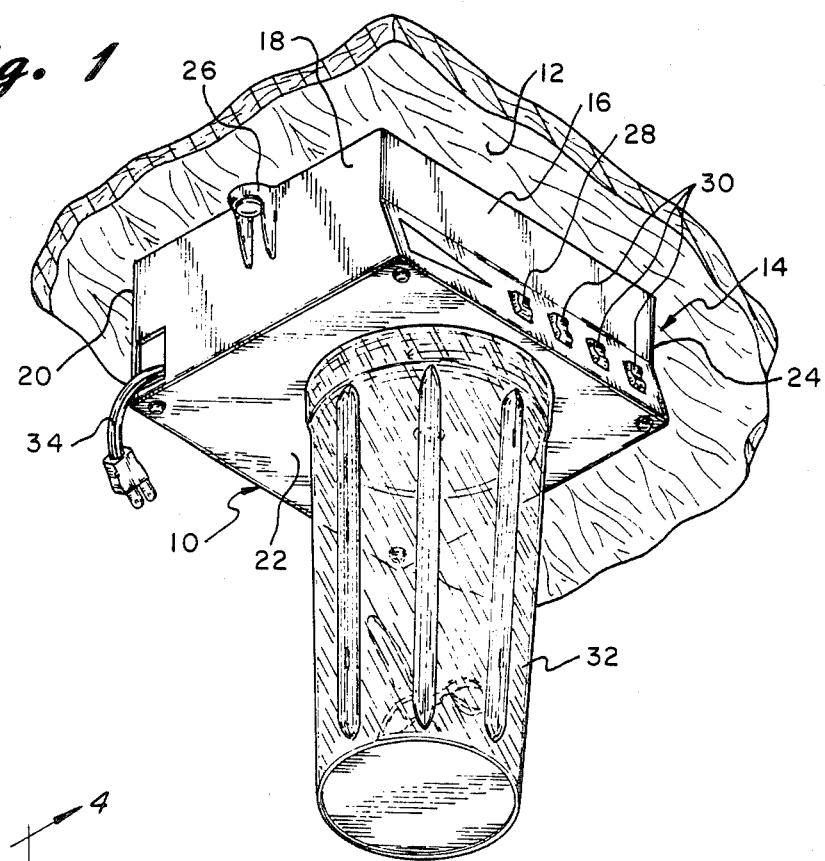
FIG. 1 is a perspective view of a blender of the present invention attached to the underside of a kitchen cabinet.
Figure 2:
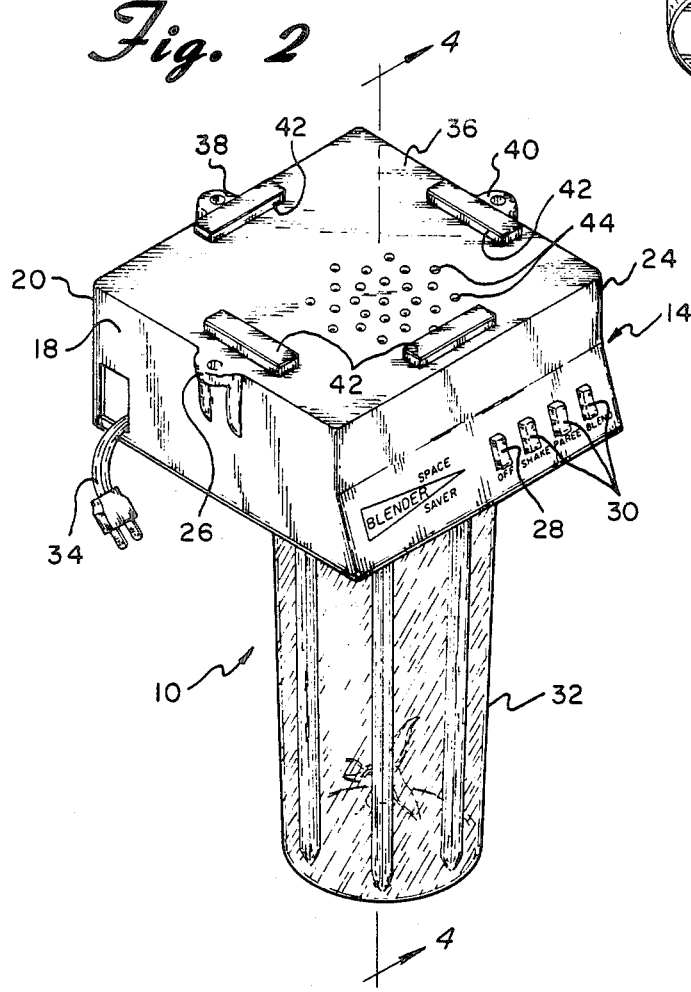
FIG. 2 is a perspective view looking downwardly to the top of the blending device illustrated in FIG. 1.
Figure 3:
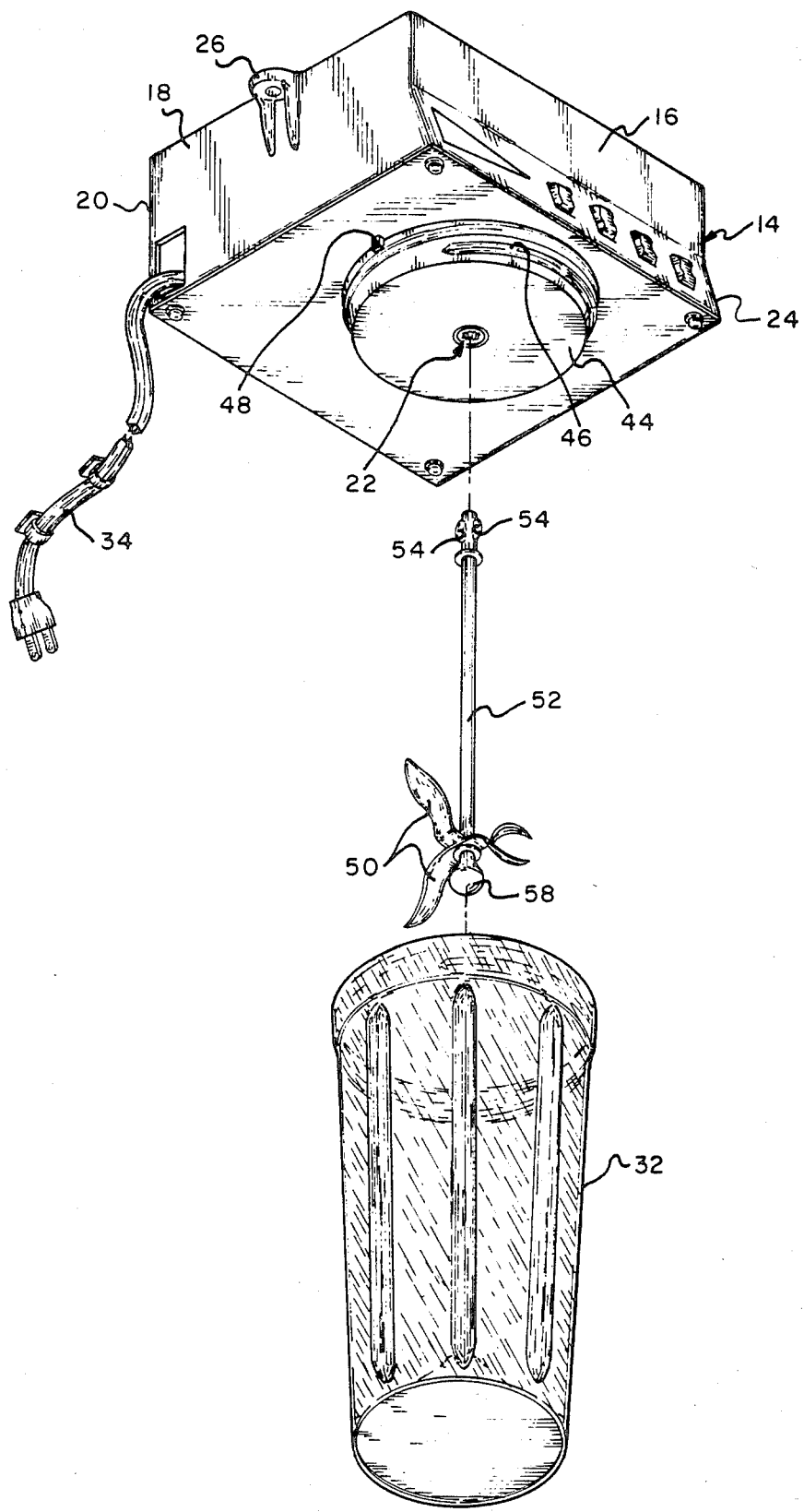
FIG. 3 is an exploded perspective view of the device illustrated in FIG. 1.
Figure 4:
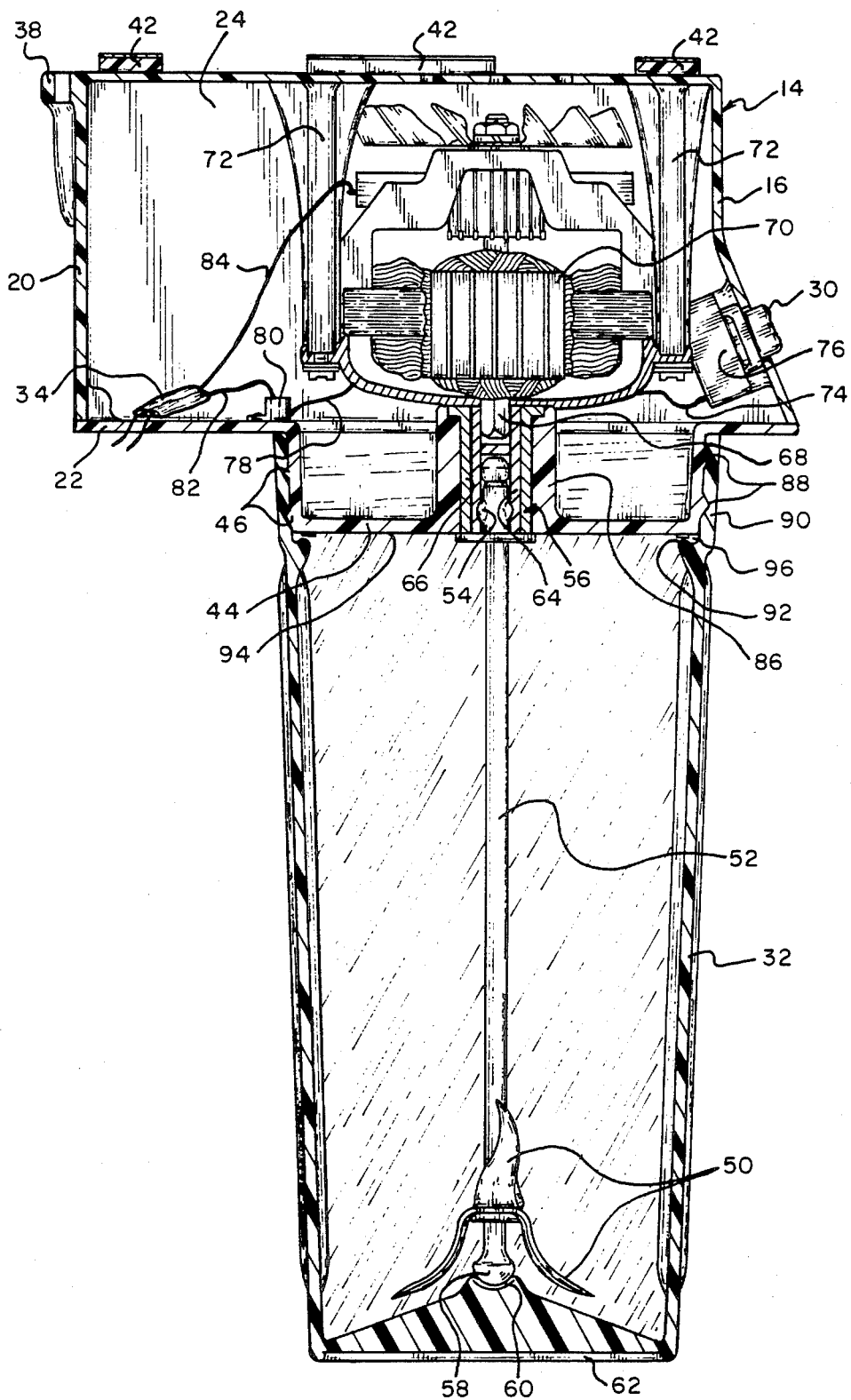
FIG. 4 is a vertical cross-sectional view taken along 4—4 of FIG. 2.
Figure 5:
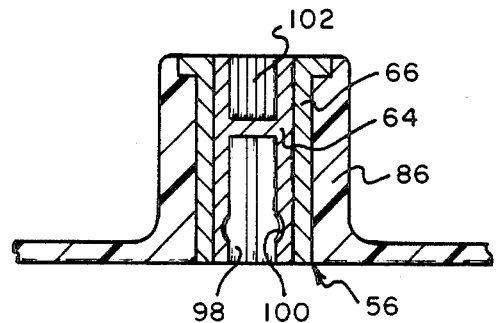
FIG. 5 is a partial cross-sectional view of the bushing mechanism expanded to illustrate the connection of the blending shaft to the motor shaft.
Figure 6:
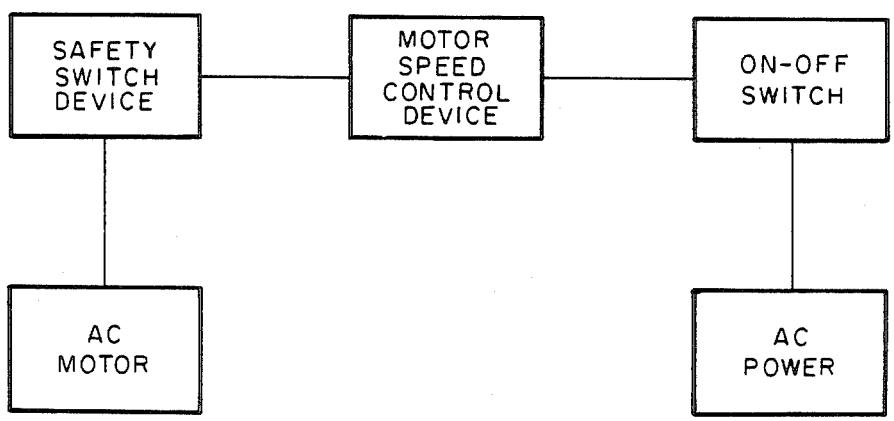
FIG. 6 is a schematic electrical diagram of the device illustrated in FIG. 1.

In FIG. 1, blender device 10 is shown attached by screws to bottom 12 of a kitchen cabinet with device 10 extending downwardly from under the cabinet. To view some of the hidden walls in this and other views, it may be necessary to refer to FIGS. 2 and 4. Housing 14 is attached by wood screws through reinforced tab 26 extending outwardly from left side wall 18 and similar reinforced tabs on right side wall 24, hidden in this view, and back side wall 20, also hidden in this view. Housing 14 also includes front wall 16 and bottom wall 22 extending from front wall 16 are a plurality of push buttons which pull the motor speed including off push button 28 and speed control buttons 30. When any of the speed buttons are pushed, the motor spins, spinning the blade to mix materials in the blender. Button 28 is depressed to turn off the motor and stop the spinning. Cylindrical cup container 32 is threadably engaged and hangs from bottom wall 22. Wire 34 extends from housing 14 plugged into an available electrical outlet with excess cord being pushed in and stored inside housing 14. In FIG. 2, top wall 36 of housing 14 is in view showing the relative locations of tab 26 extending from side wall 18; tab 38 extending from back wall 20 and tab 40 extending from right side wall 24. Each tab receives a wood screw to allow easy attachment to the bottom surface of the cabinet. A plurality of rubber spacers 42 are positioned to hold tab wall 36 a sufficient distance away from the bottom of the cabinet to allow air to circulate through holes 44 to cool the motor. In the exploded view of FIG. 3, cup 32 has been moved away from bottom 22 showing cylindrical extension 44 which is an integral molded part of bottom 22. Extension 44 extends downwardly from bottom 20 and has molded male threads 46 extending outwardly from the vertical side wall of cylindrical shape to provide engagement of cup 32. Male threads 46 and the female threads molded into the upper inside edge of cup 32 provide a full engagement with about a 180° degree turn. Safety switch button 48 extends downwardly through bottom wall 22 positioned to be depressed when cup 32 is threadably engaged and abuts bottom wall 22. Blades 50 are fixed to the bottom end of shaft 52 which is divided with detent extensions 54 at the upper end to springably engage and be held in detent connection device 56. The shape and fluid penetrating angle of blades 50 create a vertical upward force on the blades and shaft 52 tending to hold the shaft in contact with detent connection device 56. Shaft 52 extends downwardly a short distance past blades 50 and terminates in rounded end 58 which rests on the bottom of cup 32 as illustrated in FIG. 4. Rounded end 58 rests on a mating surface of spherical cup depression 60 extending upwardly from bottom 62 of cup 32. The bottom inside surface of cup 32 is generally in the shape of a cone to allow blades 50 to mix essentially all materials in the bottom of cup 32 and yet be supported by depression 60 on which end 58 of shaft 52 rests. Shaft 52 is detentably connected into detent connection device 56 which is similar in construction to that used in electric mixers with the detent extensions 54 springably engaged into rotating sleeve 64 supported inside connection device housing 66. The top end of sleeve 64 receives motor shaft 68 driven by motor 70 fixed to housing 14 by motor support members 72. Motor 70 is electrically connected through wires 74 to speed control device 76 including on switch actuated by button 28 and on speed control buttons 30. Motor 70 is electrically connected through wires 78 to safety switch 80 which is actuated by safety switch button 48. When button 48 is depressed, electrical current will pass along wires 78 to motor 70, but if button 48 is not depressed, motor 70 will not spin inadvertently. Wires 82 and 84 connect the electrical power source to the motor and to the electrical circuit. Detent connection device 56 is supported and held in position by internal cylindrical support member 86 extending inwardly from the bottom of downwardly raised cylindrical section 44 and opens to the inside of housing 14 and the motor drive shaft. Female threads 88 are molded to the inside surface of cup 32 at upper edge 90 to threadably engage male threads 46 on the outside vertical surface of cylindrical downwardly raised cylindrical section 44. Below threads 88, shoulder 92 extends annularly around the inside surface of cup 32 to engage bottom surface 94 of raised cylindrical section 44. An elastic contact surface, such as silicon polymeric rubber, may be fixed to bottom surface 94 to abut shoulder 92 which essentially prevents liquid from escaping from the inside of cup 32. Annular trough 96 is positioned around and outside shoulder 92 below the inside surface of cup 32 as it extends upwardly toward threads 88. Trough 96 further tends to catch any liquid and prevent liquid flow out of the cup. The expanded view of FIG. 5, detent connection device 56 is further illustrated showing rotating sleeve 64 having lower detent spring opening 98 opening downwardly to receive the top end of shaft 52 (not shown here). Detent springs 100 engage the horizontal projections 54 (not shown here) on the upper end of shaft 52 to hold the shaft into position while spinning. Upper end of sleeve bushing 64 is of a shape 102 to receive and hold motor shaft 68 (not shown here). When shaft 68 spins, sleeve bushing 64 is spun also spinning shaft 52 which is engaged into detent opening 98. Housing 66 holds spinning bushing 64 and is fixed in position into housing internal support 86. The schematic diagram of FIG. 6 shows the electrical circuit of AC power through the on/off switch and the motor speed control device 76 connected in series through the safety switch device 80 to power the AC motor 70.

While this invention has been described with reference to the specific embodiments disclosed herein, it is not confined to the details set forth and the patent is intended to include modifications and changes which may come within and extend from the following claims.

I claim:

1. A blending device mountable on an underside of a wall mounted kitchen type cabinet comprising:
   (a) a housing having a top wall, a bottom wall and a front side wall,
   (b) a mounting means to mount the housing on the underside of a wall cabinet,
   (c) a shaft detent connection means extending through the bottom wall of the housing to disengageably connect to a shaft held vertically from the connection means,
   (d) a motor drive means to receive electrical current and rotatingly spin the connection means,
   (e) control means to vary the rate of rotation of the motor drive means,
   (f) wiring means to electrically connect the motor drive means and the control means to an electrical power source,
   (g) annular threads molded into and extending downwardly from the bottom wall of the housing positioned with the connection means in the center of the annular threads,
   (h) a cylindrical cup shaped container having an open top, a top edge of the cup around the periphery of the open top, a bottom, and annular threads proximate to the top edge of the container, the threads being of size and shape to engage the annular threads from the bottom wall and hold the container upright to the housing, and
   (i) the shaft having an upper end and a lower end disengagingly connected at the upper end to the connection means and a blender blade means secured to the lower end of the shaft and extending outwardly from the shaft to vigorously blend and mix liquids and solids in the container when rotated at a high rate of speed by the motor drive means.

2. The device of claim 1 wherein vent holes are provided in the top wall of the housing and spacers are provided to hold the top wall away from the underside of the cabinet.

3. The device of claim 1 wherein the control means comprises a plurality of buttons, one to turn the motor drive means off and the balance of the buttons to turn the motor drive means on and to adjust the speed of rotation of the connector means and the shaft.

4. The device of claim 1 wherein a switch is positioned extending through the bottom wall where the top edge of the container abuts the bottom wall and depressing the switch when the container is threadably connected to the housing, wherein the switch is connected to the power source with the wiring means such that current is provided to the motor drive means only when the switch is depressed.

5. The device of claim 1 wherein a convex area is provided in the cup bottom extending upwardly into the container with a depression in the center of the convex area to receive a rounded lower end of the shaft, positioned such that the rounded lower end rests on and rotates in the depression.

6. The device of claim 5 wherein the convex area is a truncated cone shape with a depression in the center to receive the rounded lower end of the shaft.

7. The device of claim 1 which further comprises a cylindrical shape being an integral part of the housing having a vertical annular wall extending downwardly from the bottom wall with male annular threads molded into the vertical surface of the cylindrical shape with the connection means extending downwardly through the center of the cylindrical shape.

8. The device of claim 7 wherein the annular threads of the container are female threads cut out of the interior wall proximate to the top edge of the container.

9. The device of claim 1 wherein the annular threads in the bottom wall of the housing and the annular threads of the container proximate the top edge of the cylindrical container are of a shape and size to provide engagement and disengagement of the container from the housing with no more than a 180° degree turn.

10. A blender device mountable on a wall or under a cabinet comprising:
   (a) a housing having a top wall, a bottom wall and a front side wall,
   (b) a mounting means to mount the housing on the underside of a wall cabinet,
   (c) a shaft detent connection means extending through the bottom wall of the housing to disengageably connect to a shaft held vertically from the connection means,
   (d) a motor drive means to receive electrical current and rotatingly spin the connection means,
   (e) control means to vary the rate of rotation of the connection means comprising a plurality of buttons, one to turn the motor drive means off and the balance of the buttons to turn the motor drive means on and to adjust the speed of rotation of the connection means and the shaft, (f) wiring means to electrically connect the motor drive means and the control means to an electrical power source, (g) annular threads molded into and extending downwardly from the bottom wall of the housing positioned with the connection means in the center of the annular threads, (h) a cylindrical cup shaped container having annular threads proximate to a top edge the threads being of size and shape to engage the annular threads in the bottom wall and hold the container upright to the housing, and a convex area in a bottom of the cup shaped container the convex area extending upwardly into the container with a depression in the center of the convex area to receive a rounded lower end of the shaft, positioned such that the rounded lower end rests on and rotates in the depression, (i) a switch extending through the bottom wall where the top edge of the container abuts the bottom wall, depressing the switch when the container is threadably connected to the housing, wherein the switch is connected to the power source with the wiring means such that current is provided to the motor drive means only when the switch is depressed, (ii) the shaft having an upper end and a lower end disengagingly connected at the upper end to the connection means and a blender blade means secured to the lower end of the shaft and extending outwardly from the shaft to vigorously blend and mix liquids and solids in the container when rotated at a high rate of speed by the motor drive means.

11. The device of claim 1 which further comprises a cylindrical wall extension having a vertical annular wall being an integral part of the housing extending downwardly from the bottom wall with male annular threads molded into the vertical surface of the cylindrical wall extension with the connection means extending downwardly through the center of the cylindrical wall extension.

12. The device of claim 11 wherein the annular threads of the container are female threads cut out of an interior surface proximate to the top edge of the container.

13. The device of claim 12 wherein the annular threads in the bottom wall of the housing and the annular threads in the top edge of the cylindrical container are of a shape and size to provide engagement and disengagement of the container from the housing with no more than a 180° degree turn.

* * * * *